Figures 1, 2:
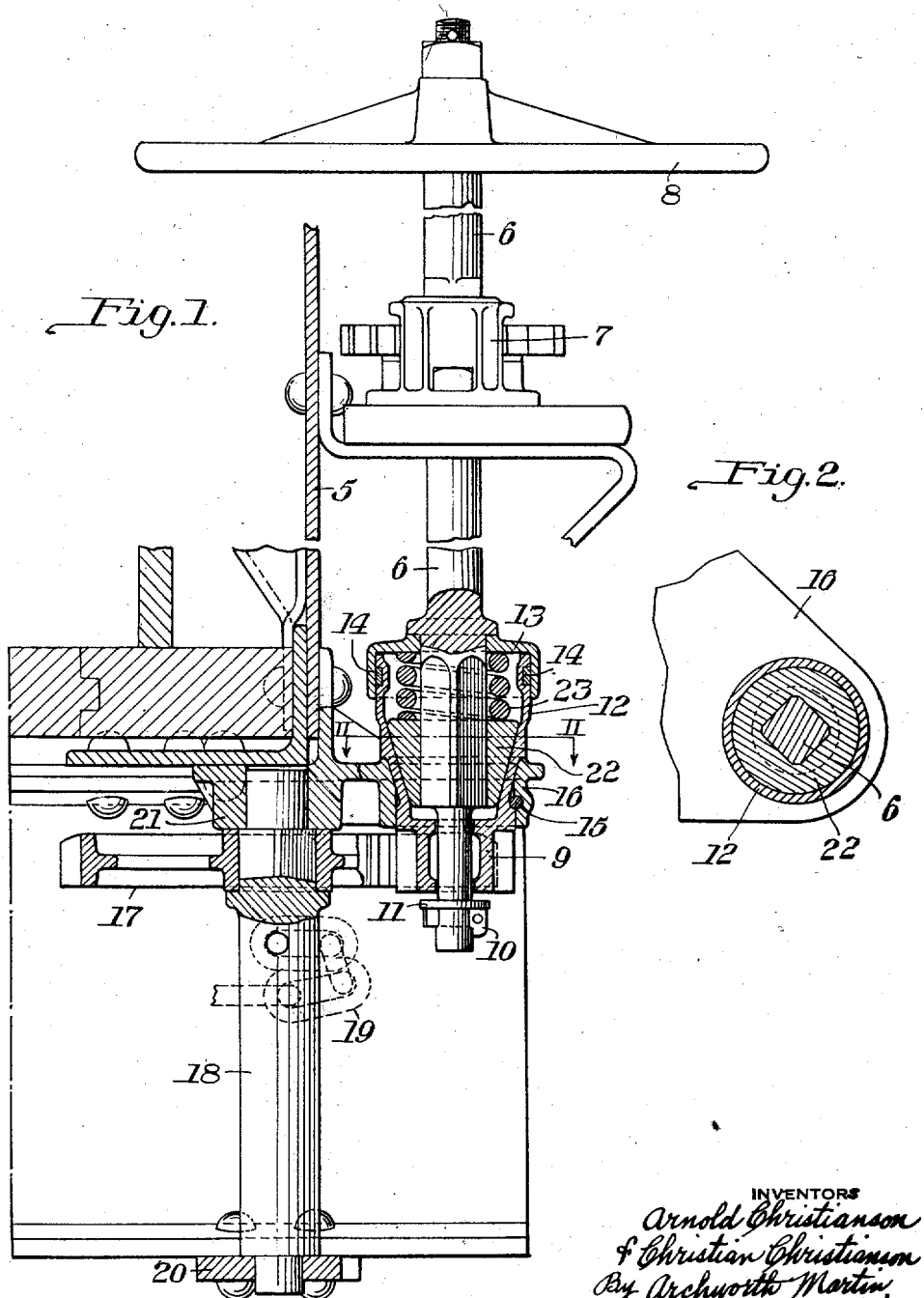

May 15, 1928.  1,669,862

A. CHRISTIANSON ET AL

BRAKE STRUCTURE

Filed Jan. 26, 1927   2 Sheets-Sheet 1

INVENTORS
Arnold Christianson
& Christian Christianson
By Archworth Martin,
Attorney.

May 15, 1928.  1,669,862
A. CHRISTIANSON ET AL
BRAKE STRUCTURE
Filed Jan. 26, 1927  2 Sheets-Sheet 2
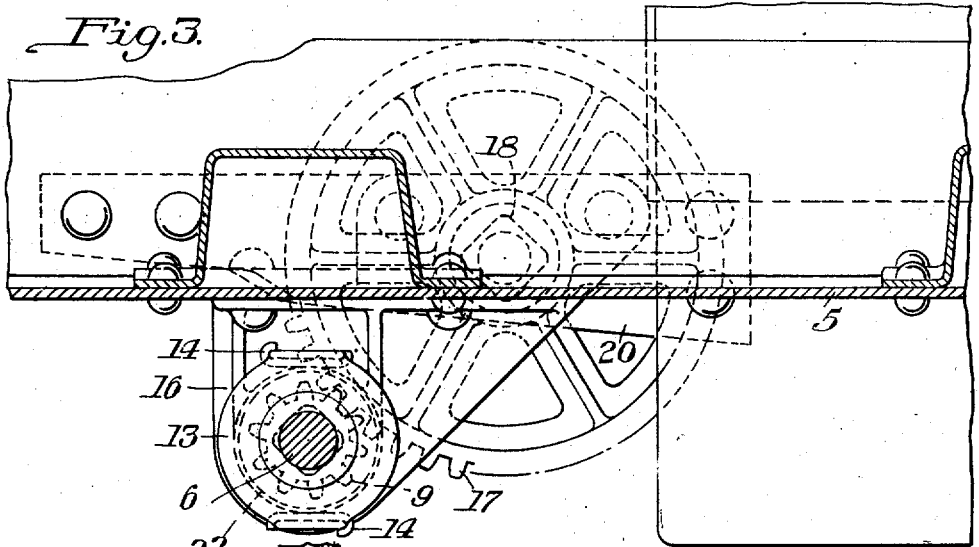
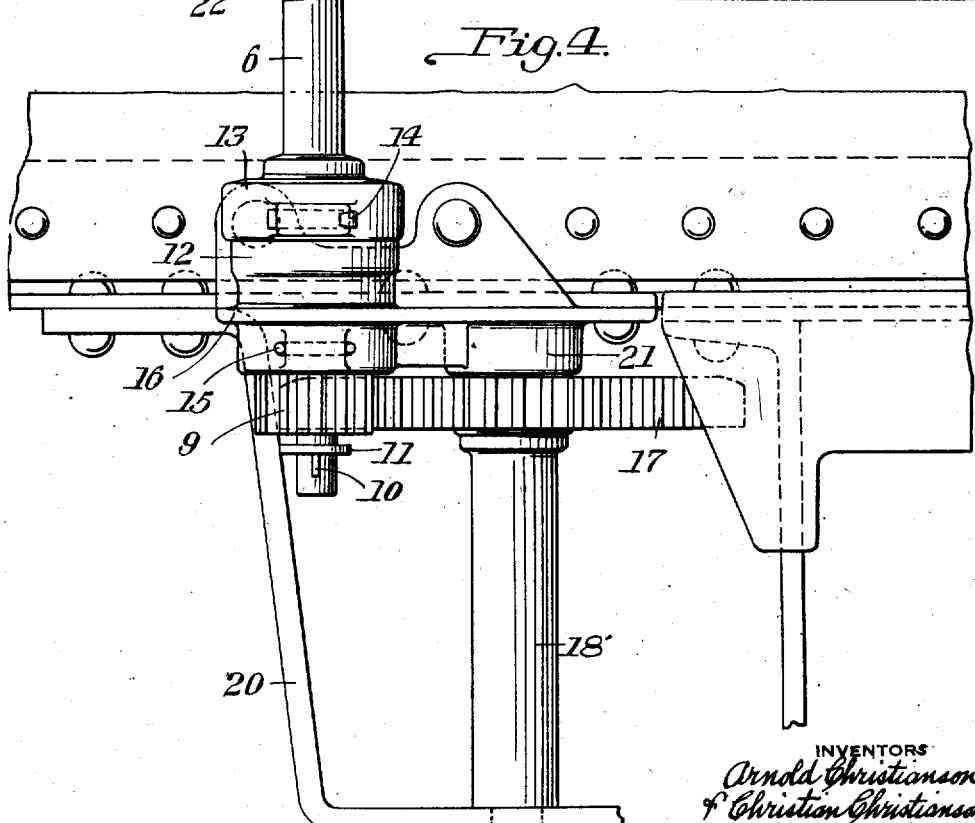
INVENTORS
Arnold Christianson
& Christian Christianson
By Archworth Martin
Attorney.

Patented May 15, 1928.

UNITED STATES PATENT OFFICE.

ARNOLD CHRISTIANSON AND CHRISTIAN CHRISTIANSON, OF HAMMOND, INDIANA.

BRAKE STRUCTURE.

Application filed January 26, 1927. Serial No. 163,640.

Our invention relates to brake structures, and is hereinafter particularly described in connection with the manual application of braking power to railway car wheels, but is more comprehensive in its broader aspects, since it may be employed in connection with various other types of apparatus, wherein it is desired that the amount of force exerted upon a given piece of apparatus shall not exceed a predetermined degree.

Our invention has for its object the provision of means for automatically preventing power in excess of a predetermined degree from being transmitted from an actuating member to an actuated member.

Another object of our invention is to simplify and improve the structure and operation of railway car brakes.

More specifically stated, our invention is directed to the provision of what may be termed a "slip clutch mechanism" for transmitting braking power from an operating shaft to the brake levers, the purpose being to prevent such great braking force being applied as will cause the wheels to slide and flat spots to become worn thereon. For instance, a trainman or brakeman of average strength may be able to apply exactly the degree of braking power required. In the event that a much stronger man applies the brakes, or a lever such as a brake club is employed, it frequently happens that the brake shoes are caused to engage the car wheels with such force as to cause the wheels to slide.

One form which our invention may take is shown in the accompanying drawing, wherein Figure 1 is a sectional view, in side elevation, of a portion of a railway car equipped with our invention; Fig. 2 is a view taken on the line II—II of Fig. 1, Fig. 3 is a plan view of the apparatus of Fig. 1, and Fig. 4 is a front elevational view of the apparatus of Fig. 1.

In the drawings, we have shown a portion 5 of the front end of a car, upon which a brake-operating shaft 6 is mounted. The shaft 6 is provided with the usual pawl and ratchet mechanism 7 and handwheel 8, the pawl and ratchet mechanism serving to lock the shaft 6 against unwinding movement, in the usual manner. The lower end of the shaft 6 extends through a bearing bracket 9 and is held against upward movement by a removable pin 10 and a washer 11. A clutch housing 12 is formed integrally with the bracket 9 and is provided with a cover 13 that is detachably secured in position upon the housing 12 by keys 14. A removable key 15 holds the clutch housing 12 within a bearing bracket 16, and is so arranged as to permit rotative movement of the housing within such bracket. The portion 9 of the housing 12 is provided with teeth and functions as a pinion, in a manner to be hereinafter described.

The teeth of the member 9 mesh with the teeth of a gear wheel 17 that is mounted upon a squared portion of a winding shaft 18 upon which is wound a brake chain 19 that is connected to the usual brake levers (not shown). The lower end of the shaft 18 is journaled in a stirrup 20 which is secured to the car body and the upper end thereof is rotatably mounted in a bearing 21 that is formed in the bracket 16.

Within the clutch housing 12, we provide a clutch member 22 which is of truncated conical form, and has a rectangular perforation extending axially thereof into which a squared portion of the brake shaft 6 extends. The shaft 6 is rotatable with respect to the housing 12 and its cover member 13, and is non-rotatable with respect to the clutch member 22. A compression spring 23 is disposed between the cover 13 and the clutch member 22 so as to yieldably maintain the clutch member in frictional engagement with the clutch housing 12, so that when the shaft 6 is operated, rotative movement of the clutch member 22 is imparted to the clutch housing 12 and the pinion-like member 9, to rotate the shaft 18. The spring 23 will, of course, be so calibrated that when the brake chain 19 has been tightened to the desired degree of tension, the clutch member 12 will slip on its seat within the housing 12. Therefore, additional force imparted to the brake wheel 8 will not be transmitted to the shaft 18.

The parts can be quickly disassembled for inspection, adjustment and repairs. For instance, by removing the pin 10 and washer 11, the brake shaft 6 may be elevated clear of the housing 12 and the clutch member 22, while removal of the pin 15 will permit the clutch housing and contained parts to be removed from the bearing bracket 16. Removal of the keys 14 will permit the covers 13 to be taken off and the spring 23 and clutch member 22 to be removed from the housing 12.

We claim as our invention:

1. Railway brake structure, comprising an operating shaft, a clutch housing through which said shaft extends, a conically shaped clutch member non-rotatably connected to said shaft and loosely engaging the inner wall of said clutch housing, pinion teeth attached to the lower end of said clutch housing, a chain winding shaft, and a gear wheel connected to said shaft and meshing with the teeth of said pinion member.

2. Railway braking structure, comprising a bracket member, a clutch housing rotatably supported within said bracket member, a brake shaft extending into said housing, a clutch member non-rotatably connected to said shaft and having frictional driving engagement with said clutch housing, pinion teeth secured to the lower end of the clutch housing, a winding shaft journalled in said bracket member, and a driving connection between said pinion teeth and winding shaft.

3. Railway brake structure, comprising a bracket member having an opening therethrough, a clutch housing extending through said opening and rotatably mounted therein, pinion teeth secured to the lower end of said clutch housing, the diameter of the toothed portion of the housing being less than the diameter of said opening, a clutch member seated within said housing and having frictional driving engagement therewith, an operating shaft connected to said clutch member, and means for transmitting power from said pinion teeth to brake mechanism.

4. Railway brake structure, comprising a fixed bracket member, a friction clutch member journaled in said bracket, a brake-operating shaft, a friction clutch member connected to said shaft, means for yieldably holding said clutch members in driving engagement with one another, and means associated with the first-named clutch member for actuating a brake-applying device.

In testimony whereof we, the said ARNOLD CHRISTIANSON and CHRISTIAN CHRISTIANSON, have hereunto set our hands.

ARNOLD CHRISTIANSON.
CHRISTIAN CHRISTIANSON.